Jan. 12, 1943. A. D. MacLEAN ET AL 2,308,187
INTERMITTENT PRESSURE CONTROL SYSTEM
Filed Feb. 20, 1939 4 Sheets-Sheet 1

INVENTORS.
Allen D. MacLean.
Fritz Niesemann.
Lewis D. Konigsford
BY ATTORNEY.

Jan. 12, 1943.  A. D. MacLEAN ET AL  2,308,187
INTERMITTENT PRESSURE CONTROL SYSTEM
Filed Feb. 20, 1939  4 Sheets-Sheet 2

INVENTORS.
Allen D. MacLean.
Fritz Niesemann.
Lewis D. Knigeford
BY  ATTORNEY.

Patented Jan. 12, 1943

2,308,187

UNITED STATES PATENT OFFICE 2,308,187

INTERMITTENT PRESSURE CONTROL SYSTEM

Allen D. MacLean and Fritz Niesemann, Pittsburgh, Pa., assignors to Pittsburgh Equitable Meter Company, Pittsburgh, Pa., a corporation of Pennsylvania Application February 20, 1939, Serial No. 257,388

14 Claims. (Cl. 50—16)

This invention relates to fluid pressure distribution systems, and particularly to gas distribution systems in which it is desired to automatically vary the pressure in the distribution main in accordance with the consumer demand.

It is an object of the invention to provide a pressure regulating system which will be periodically responsive to increased flow in the main to boost the pressure therein in steps or stages.

A further object of the invention is the provision of a fluid pressure regulating system which will not be subject to surges of pressure and may be adjusted to compensate or nullify surges which otherwise would occur.

A further object of the invention is the provision of a pressure regulating system in which the regulator is loaded in accordance with the rate of flow at periodic intervals and is maintained at such load until the next interval.

The present invention is an improvement on the system disclosed and claimed in the application of Allen D. MacLean for Fluid distribution system, Serial No. 230,543, filed September 16, 1938.

As will hereinafter appear, the invention may be applied to systems employing direct acting regulators, pilot controlled, or pilot loaded regulators.

The invention will be described in connection with the accompanying drawings, wherein I have shown a preferred embodiment of the invention by way of illustration, and wherein.

Referring to the drawings, the numerals 1 and 2 represent high and low pressure mains respectively of a distribution system with a regulator body 3 therebetween having a reducing valve 4 therein which preferably is of the balanced type. The valve 4 as shown is connected by a fulcrumed lever 5 to the operating stem 6 of a pressure responsive device indicated generally by the numeral 7. The pressure responsive device preferably comprises a case having a diaphragm 8 therein of suitable construction and a sealing diaphragm 9 to separate the fluid pressure responsive chamber 11 from the pressure within the regulator body 3, and the compartment above the diaphragm 8 is vented to the atmosphere in the usual manner. The diaphragm 8 is weighted in any suitable manner, as for example, by weight 12, which can be changed as desired.

Pilot control system

Figure 1:
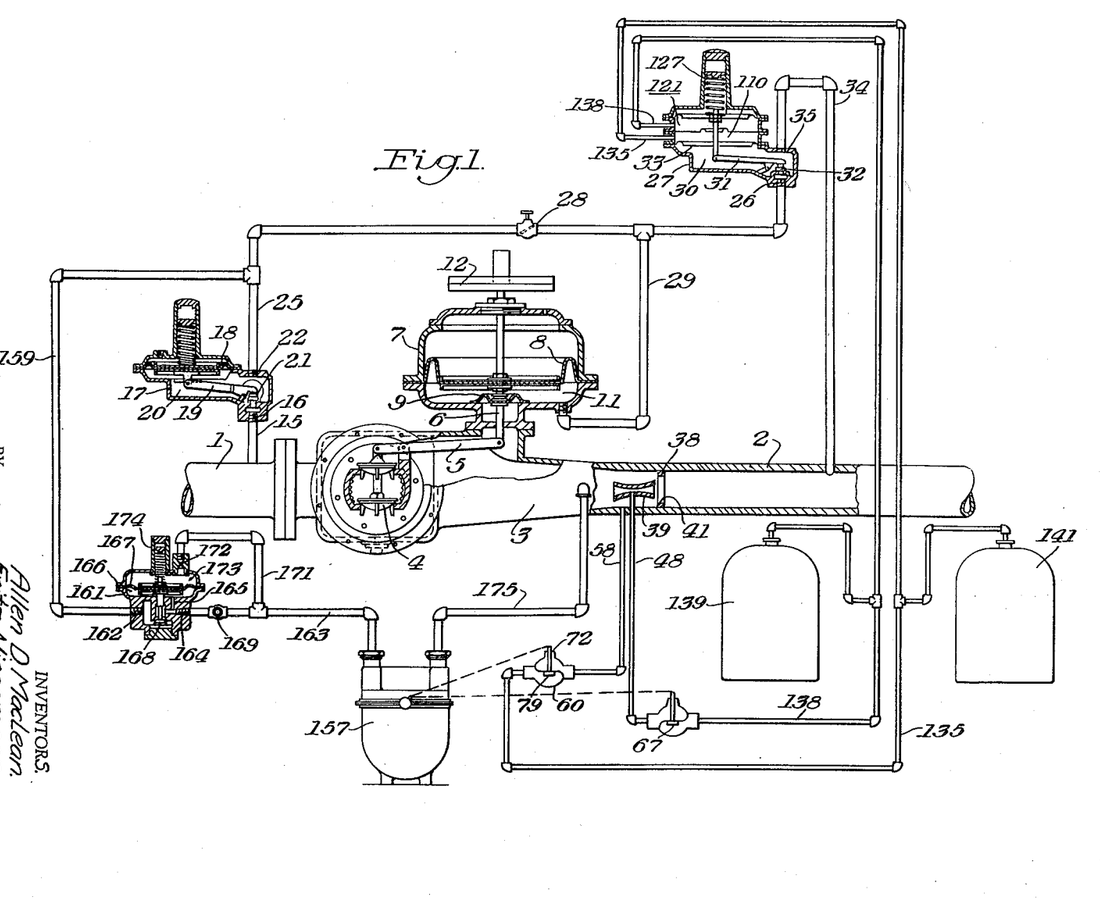
Figure 1 is a partly diagrammatic view showing a preferred modification of the system.

The pilot control system comprises a conduit 15 connected at one end to the high pressure main 1 and at the other end to the inlet 16 of an outlet pressure regulator 17 shown partly diagrammatically in Figure 1. This regulator 17 may be of any suitable construction, and comprises principally a diaphragm 18 secured to a pivoted lever 19 having a valve member 21 at its opposite end for closing the inlet 16, the outlet 22 of the regulator connecting directly with the outlet chamber 20 under the diaphragm.

A conduit 25 leads from the outlet of a regulator 17 to the inlet 26 of a regulator 27, and has a throttling orifice 28 interposed therein which may be fixed or adjustable as desired. Regulator 17 primarily serves to reduce the pressure in conduit 25 to some convenient value and when the pressure in main 1 is not too variable or too high for the diaphragm 8, regulator 17 may be omitted, if desired, conduit 25 being connected directly into main 1. A conduit 29 is connected to conduit 25 downstream from the orifice 28 and is connected to the control chamber 11 of the main regulator. The regulator 27 has a diaphragm 33 over an outlet chamber 30 and which is secured to a pivoted lever 31 having a valve 32 at its opposite end for closing the inlet 26. The regulator 27 may be considered as an outlet pressure controlled relief valve for certain purposes and the special construction and function of the regulator 27 will hereinafter be described. A conduit 34 is connected from the outlet 35 of the regulator to the low pressure main 2.

Pressure differential producing means

Figure 2:
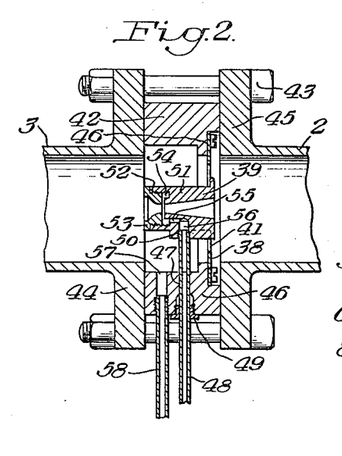
Figure 2 is an enlarged view of a preferred pressure differential producing device.

The low pressure main 2 has a pressure differential producing device, shown diagrammatically in Figure 1 as an orifice plate 38 and an inserted Venturi section 39 positioned adjacent the opening 41 in the orifice plate. However, any other type of differential pressure producer may be used. The preferred pressure differential producing device is shown in detail in Figure 2, and comprises a hollow cylindrical body member 42 inserted in the pipe line and clamped by bolts 43 between the flange 44 of the regulator body 3 and flange 45 of the adjacent pipe section of the low pressure main. The orifice plate 38 is secured by screws, or in any other suitable manner to the internal shoulder 46 of the insert 42. The insert has a hole 47 therein through which passes the pipe or conduit 48 connected by a vent 50 with the interior of Venturi section 39, said conduit being sealed by stuffing box 49. The inserted Venturi section consists of two parts, a main body 51 having a concentric threaded recess 52 therein, and a threaded portion 53 received in the recess 52 in the main body so as to provide an annular passage 54 at the throat of the Venturi section which communicates by connecting passages 55 and 56 with the interior of the conduit 48. A threaded vent 57 in the body member 42 has a conduit 58 threaded therein which provides a piezometer connection to the exterior. The differential pressure producing device, comprising an orifice plate and inserted Venturi section herein described, is preferred because it is compact and within a very short length a great differential in pressure and excellent recovery can be produced with an overall pressure loss much less than would be produced by an orifice plate alone required to give the same differential pressure.

*Interrupter valves*

Figure 3:
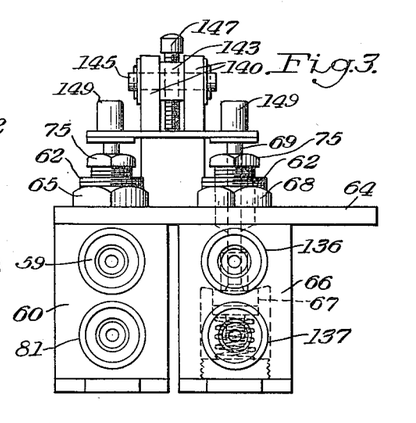
Figure 3 is an elevation of the interrupter valves.

Conduit 58 is connected to the inlet 59 of an interrupter valve, shown diagrammatically in Figure 1 and indicated generally by the numeral 60. This interrupter valve 60 comprises a cylindrical body having a threaded extension 62 passing through a bore 63 in a plate 64 and held thereto by a nut 65. The plate 64 has a second bore therein which receives a second interrupter valve case 66 having a valve 67 and stem 69 therein constructed exactly like the valve 60 and held by the nut 68. As valve 66 is exactly like valve 60, only valve 60 will be described in detail. The body of valve 60 has a bore 71 through which extends a valve stem 72. The bore 71 is surrounded by a packing recess 73 which receives a packing 74 that is compressed by the gland 75, the valve stem 72 extending through the gland. A second recess or inlet chamber 76 surrounds the valve stem and is in communication with the internally threaded inlet piece 77 welded or otherwise suitably secured to the body. The casing 60 is counterbored at 78 to provide a valve chamber, and a valve 79 in this chamber is secured to the valve stem 72.

The valve 79 is preferably made of a soft material, such as lead, rubber, thiokol, "Duprene" or the like, and is forced over the retaining shoulder 80 by stretching.

An outlet piece 81, suitably secured to the valve casing, communicates with the valve chamber 78. A spring 82 abutting a shoulder 83 on the valve stem 72 and a threaded cap 84 holds the valve 79 normally closed.

It will be observed that the seat 85 of the valve is conical in form, having a slight angle with the horizontal. This form is of particular advantage in conjunction with a soft valve because as the seating pressure on the valve is increased this pressure is distributed over an increasing area which decreases the tendency of the seat to cut a groove into the valve. Even if a groove becomes worn in the valve, a new area will come into coaction with a new area of the seat and thus prevent leakage. I prefer to form the seat on an angle of about 12° from the horizontal. Also the stuffing box 73 is on the inlet side of the valve so that leakage therethrough will not affect the pressure in the valve chamber 78.

*Differential responsive regulator*

Figure 5:
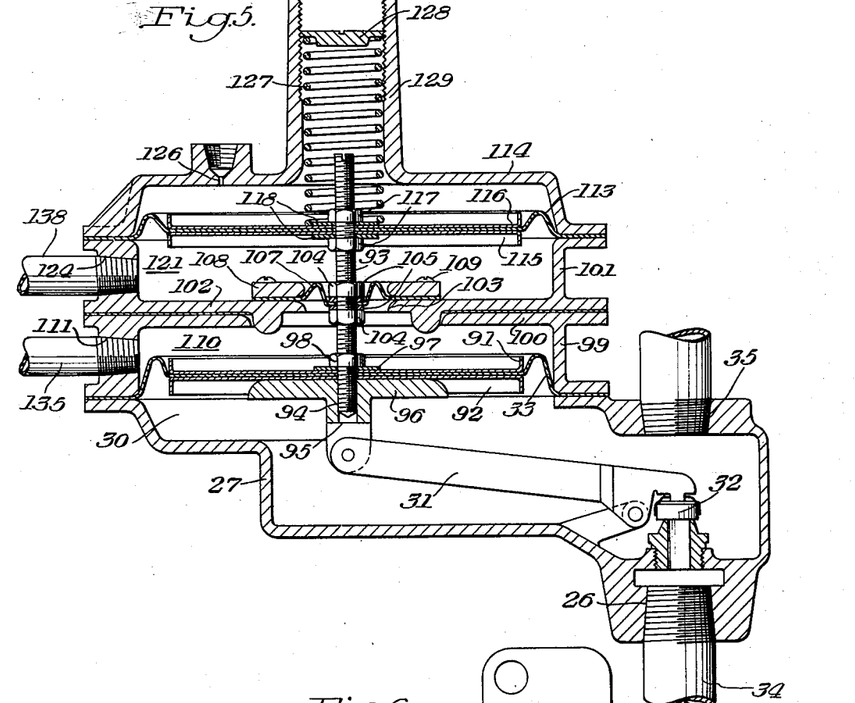
Figure 5 is an enlarged view in section of the differential responsive regulator.

The center diaphragm 33 of the regulator 27 is secured between two diaphragm pans 91 and 92 which have central holes through which extends the threaded diaphragm stem 93. The stem 93 is threaded at its lower end 94 into the threaded hole 95 of the support 96, a washer 97 being located above the diaphragm pan 91 and the assembly being held in position by a nut 98. The outer periphery of the diaphragm is held between the flanged lower casing of the regulator and an intermediate flanged case 99 having a perforate top wall 100 located above the diaphragm 29. A second flanged case 101 having a perforate bottom wall 102 is secured above case 99. The stem 93 extends through a central opening 103 in the bottom wall 102 and has two nuts, 104 and washers 105 thereon, between which is clamped a sealing diaphragm 107. The outer periphery of this diaphragm 107 is clamped against the dividing wall 102 by a clamping ring 108 held thereon by screws 109 or in any other suitable manner. There is thus formed a sealed pressure chamber 110 between diaphragm 29 and wall 100 which has outside communication by the threaded pipe tap 111.

A second operating diaphragm 113 is secured at its outer periphery between the flanged case 101 and a cover 115 and at its center is clamped the operating stem 93 by diaphragm pans 115 and 116, nuts 117 and washers 118. Thus a second pressure chamber 121 is provided between diaphragm 113 and wall 102 which has outside communication by the threaded pipe tap 124. The cover 114 of the regulator has a suitable vent 126 therein, and receives a spring 127, the compression of which may be adjusted by a plug 128 threaded into the extension 129 of the cover. The extension 129 may be sealed by a cap 131.

The inlet 59 of the valve 60 is connected to the conduit 58, and the outlet 81 of this valve is connected by conduit 135 to the middle pressure chamber 110 of the regulator 27. The inlet 136 of valve 66 is connected to the conduit 48, and the outlet 137 is connected by conduit 138 to the upper pressure chamber 121 in the regulator 27. Suitable reservoirs 139 and 141 are connected to conduits 138 and 135 respectively to prevent rapid fluctuation of pressure in these conduits upon operation of valves 60 and 66. These tanks or reservoirs also provide a large volume of gas in conduits 138 and 135 of which they are a part, so that should small leakage occur from these conduits, the resulting loss of pressure therein will not be great and will not greatly influence regulator 27. Any other means may be provided for this purpose and in some cases, for example, when conduits 138 and 135 carry sufficient volume, these tanks may be omitted. The operation of valves 79 and 67 may be done manually or automatically in response to any desired condition.

*Operating mechanism of interrupter valves*

Figures 4, 7:
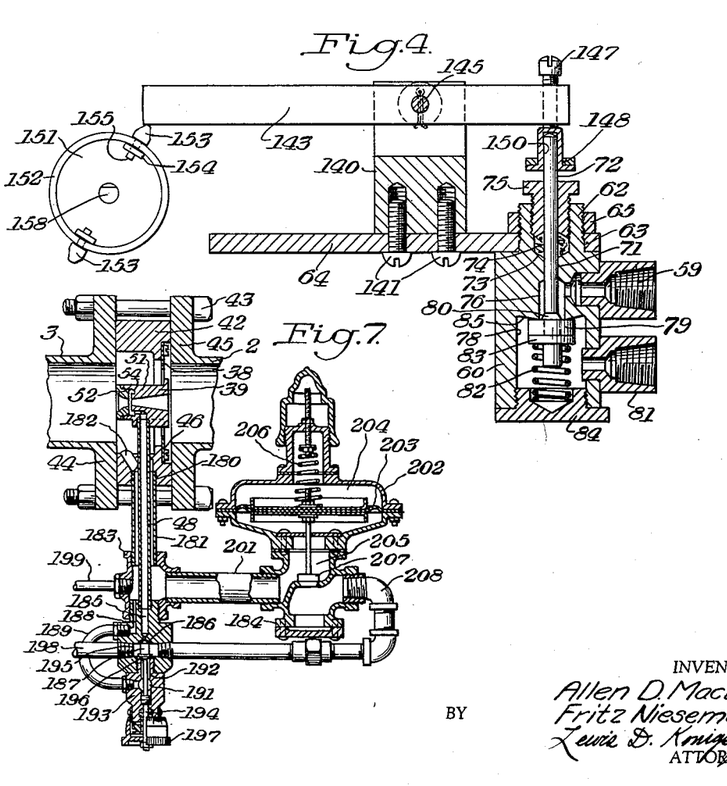
Figure 4 is a view partly in section on line IV—IV of Figure 6.
Figure 7 is a partly diagrammatic view of a modification.
Figure 6:
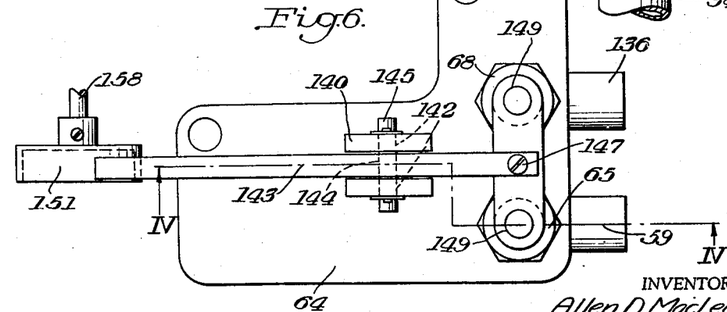
Figure 6 is a plan view of Figure 4.

In the preferred modification hereinafter described these valves are automatically timed to operate periodically at equal or unequal intervals and thus produce a boost in pressure in the main 2 in predetermined stages, which may be based on time or any other desired factor. Between boosts the regulator 7 is governed by the pressure in the regulator outlet. Referring to Figures 4 and 6, the plate 64 which is adapted to be secured to the case of a motor or other support, carries a clevis 140 secured thereto by screws 141 and which has holes 142 therethrough. An operating lever 143 has a hole 144 therethrough and a clevis pin 145 passing through the holes 142 and 144 serves as a fulcrum for lever 143. Screw 147 abuts operating bar 146 which has bores 148 at its ends which receive flanged bushings 149 having bores 150 which engage the upper ends of the stems of valves 67 and 79. When the left end of lever 143, as viewed in Figure 4, is raised, the screw 147 engages bar 146 to depress valve stems 72 and 69 to open valves 79 and 67. The raising of the left end of lever 143 preferably is accomplished by a rotating drum 151 having a flange 152 carrying one or more trip lugs 153. The lugs 153 may be secured thereto in any desired manner, as for example, by nuts 154 threaded onto the integral threaded stems 155 thereof.

The drum 151 preferably is operated by a fluid motor operating at uniform speed, and for this purpose I may employ the usual type of diaphragm gas meter 157 (Figure 1) having an index shaft 158 extended therefrom upon which cylinder 151 is secured. A preferred construction of gas meter is disclosed in U. S. Patent No. 1,862,451 of James R. Armstrong, dated June 7, 1932. The gas meter is supplied with gas by conduit 159 connected with conduit 25, and it will be observed that throttling orifice 28 tends to minimize the effect that otherwise would be produced in chamber 11 by reason of flow through conduit 159 and consequent operation of regulator 17. A regulator casing 161 is connected to conduit 159 at the inlet 162, and a conduit 163 connects the outlet 164 with the inlet of motor 157. The outlet of the regulator communicates by a conduit 165 with the control chamber 166 under diaphragm 167 and a valve 168 connected to the diaphragm controls flow through the regulator.

A throttling orifice 169, which may be fixed or adjustable, is interposed in the conduit 163 between the regulator outlet 164 and a conduit 171 is connected at one end through a vent 172 with a chamber 173 over the diaphragm 167. A spring 173 biases the diaphragm and valve 168 towards open position. The preferred construction of regulator 161 except for conduit 171 is like that disclosed in the application of Fritz Niesemann, Serial No. 128,192, filed February 27, 1937. The outlet of the motor 157 is connected by conduit 175 to the low pressure main 2.

The operation of the apparatus now will be described. For illustration, it may be assumed that it is desired to carry a minimum pressure of six inches of water in the low pressure main and increase this pressure to a maximum of ten inches of water at periods of maximum demand. The weight 12, therefore, will be selected so that it will be counterbalanced by a pressure slightly more than ten inches of water in the chamber 11, and valve 4 therefore will remain closed until the pressure in chamber 11 falls below the desired maximum. Regulator 17 is set to deliver a pressure in conduit 25 high enough to completely close the valve 4 when the full outlet pressure of reglator 17 is applied in chamber 11, and preferably should deliver a pressure about four to six inches of water higher than the pressure actually needed to just support the weight 12. The regulator 27 is set to close at an outlet pressure slightly above six inches of water during minimum flow through the main 2, with the differential pressure in conduits 58 and 48. which may be considered as substantially zero under minimum flow conditions, connected to chambers 121 and 110 respectively. The orifice 28 is adjusted or selected so that under the substantially balanced condition of valve 32 a flow through the orifice will be allowed so as to maintain the pressure in the conduit 25 slightly more than ten inches of water, or sufficient to raise diaphragm 8 and close valve 4. This can be accomplished, for example, by having the orifice 28 about one thirty second to one sixteenth inch in diameter and having the inlet 35 of regulator 27 about three eighths inch in diameter. Assuming valves 67 and 79 open, should the pressure in main 2 drop below six inches due to an increased demand, the pressure at the throat of the Venturi section is reduced because of the increased flow and the differential pressure across chambers 110 and 121 allows spring 127 to open valve 32 to permit escape of gas from conduits 25 and 29 and thus lower the pressure therein, thereby allowing weight 12 to fall and open valve 4.

This increase in flow from the high pressure main 1 and the low pressure main 2 continues until the pressure in main 2 transmitted through conduit 34 to chamber 30 is sufficient to close valve 32. Valve 32 may be considered as a relief valve for conduit 25 or chamber 11 and is outlet pressure controlled because controlled by the pressure in chamber 30 when the pressures in chamber 110 and 121 are stabilized. This will be slightly more than six inches of water because the trapped differential pressure in chambers 110 and 121 is less than normal at six inches. Should the differential pressure on regulator 27 become so great that a pressure higher than about nine inches of water is required to close the valve 32, this valve will remain closed because the pressure in conduit 25 and chamber 11 will have built up sufficiently to close valve 4 and will hold this valve closed, so that pressure in conduit 2 cannot thereafter build up high enough to open valve 32.

Instead of having the regulator 27 responsive at all times to the differential at the throat of the Venturi section, the interrupter valves 67 and 79 open momentarily at certain intervals and then close again so as to trap the differential pressure in chambers 110 and 121 of the regulator 27. As long as the valves 67 and 79 remain closed the valve 32 of the regulator remains loaded by the spring 127 and the differential pressure trapped in the chambers 110 and 121 of the regulator, and the valve 32 therefore, will remain open until the pressure in main 2 builds up sufficiently for the pressure in chamber 30 to counterbalance this loading effect and close the valve 32. Thus, the boosting action of regulator valve 4 depends on the momentary rate of flow only at certain times and between such times is stabilized so as to maintain a constant boosted pressure in the outlet pressure until such time as the interrupter valves are again opened to stabilize the system at a different boosted pressure. Each time the interrupter valves are operated the valve 4 becomes responsive to the instantaneous differential pressure at the Venturi section and acts to build up and maintain a corresponding pressure in the low pressure main 2. At the same time, however, the valve 4 is kept responsive to actual pressure conditions existing in the low pressure main by conduit 34 because any change in pressure in main 2 affects the pressure in chamber 30 under diaphragm 29 to vary the differential and thus vary the action of valve 32. This arrangement results in greater stability of the pressure in main 2 because long surges of pressure or pressure waves occurring in the main 2 cannot cause excessive increases in the boost in the main, as this boost is dependent on the trapped differential pressures in the chambers 110 and 121 of the regulator 27.

The controlling motor 157 may be set to operate the interrupter valves 67 and 79 at any desired equal or unequal intervals of time, by means of the disposition of the studs 153 around the periphery of the roller 151, or by varying the speed of the motor, or by both means. By suitably shaping the studs 153 and properly selecting the length of lever 143 and forming its end to conform to an arc about the pivot 145 as a radius the action of valves 67 and 79 may be made quite rapid, and screw 147 will enable a certain adjustment of the duration of the opening movement of the valve. Preferably the valve operations are timed to occur at intervals of about forty-five to seventy-five seconds, and preferably the valves are held open for a lesser time than the normal lag in the system between the change in pressure in the main 2 and the response of the valve 4. However, it will be understood that the duration of valve opening and intervals between openings may be varied depending on the characteristics of the system. If desired, the motor may be timed to operate at only certain periods of the day or night, and leave the valves open at other times.

It will be understood that conduit 159 can be tapped directly into the high pressure main 1 or into the conduit 25. If desired, the motor 157 may be replaced by any other type of motor, such as an electric synchronous motor, or a motor having any desired action.

Figure 8:
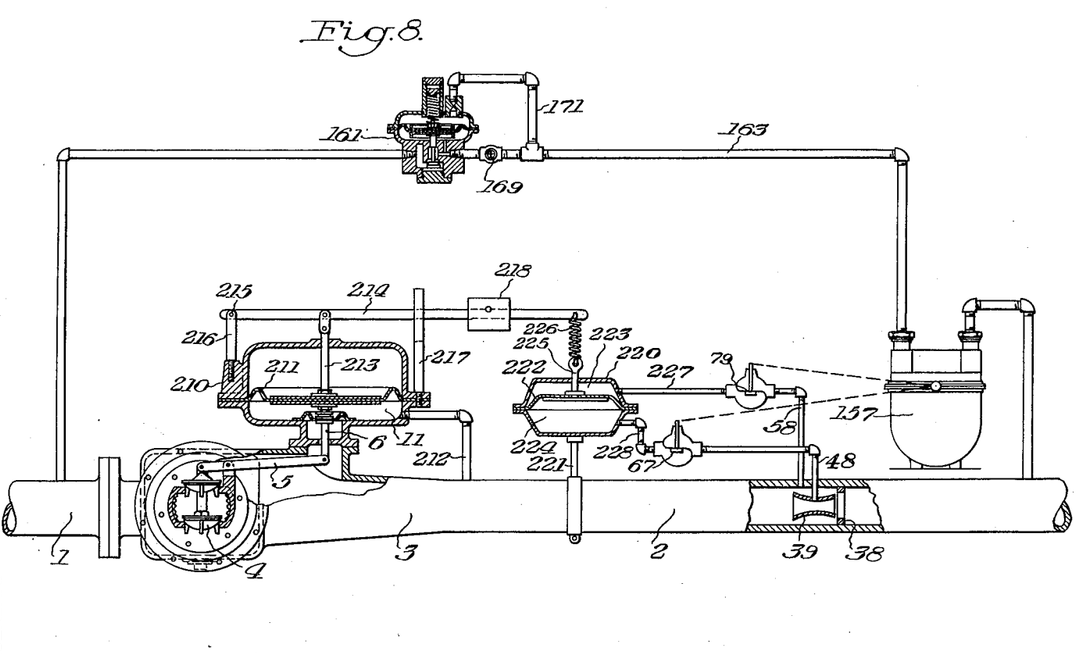
Figure 8 is a diagrammatic view showing a modification of this system shown in Figure 1.

In the modification diagrammatically illustrated in Figure 8, wherein like parts are indicated by like reference numerals, the regulator 210 has a diaphragm 211 providing a chamber 11 therein which is directly connected by conduit 212 with outlet 3 of the regulator. The stem 213, connected to diaphragm 211, is secured at its upper end to a lever 214 which is pivoted at its end 215 to a bracket 216 secured to the regulator casing, and the lever 214 is guided for movement in a forked bracket 217. A weight 218 is located on the lever 214 and may be adjusted along this lever to vary the load impressed on the diaphragm 211.

A differential loader 220 is secured to the pipe 2 by a bracket 221 of any suitable construction and has a diaphragm 222 therein providing differential pressure chambers 223 and 224 on opposite sides thereof. A rod 225, secured to the diaphragm 222, is secured to the free end of lever 214 by a suitable spring 226.

The low pressure at the throat of the inserted Venturi section 39 is transmitted by conduit 48 through valve 67 and conduit 228 to the chamber 224 of the differential loader, and the pressure adjacent the Venturi section 39 is transmitted by conduit 58, valve 79 and conduit 227 to the chamber 223 on the opposite side of the diaphragm 222.

In this modification the diaphragm 211 is governed by the pressure in chamber 11, which, being connected by conduit 212 to the outlet of the regulator 3, it will be seen that the movement of diaphragm 211 and of valve 4 is governed by the pressure in the low pressure main 2. The movement of diaphragm 222 is governed by the differential pressure in chambers 223 and 224 and when valves 67 and 79 are open this differential will correspond to the difference between the pressure in main 2 and the pressure in the throat of the Venturi section 39. The effect of this differential is transmitted by rod 225 and spring 226 to lever 214 and acts to load or unload this lever in accordance therewith. When the motor 157 intermittently opens and closes valves 67 and 79, the differential pressure is trapped in chambers 223 and 224 and influences the loading of diaphragm 211 until valves 67 and 79 are again open to change the differential pressure in chambers 223 and 224. Thus, it will be seen that at all times diaphragm 211 is subject to the pressure in the main 2, by reason of its connection therewith by conduit 212, and is variably loaded by the differential loader 220 in accordance with the rate of flow in the main 2. By operating valves 67 and 79 intermittently, pulsation of diaphragm 222 is eliminated and the action of diaphragm 211 thereby is stabilized to eliminate the effect of pulsations or fluctuations in pressure thereon. If desired, storage tanks 139 and 141 may be connected to conduits 227 and 228 to minimize changes in pressure due to movement of diaphragm 222.

In the modification shown in Figure 7, parts of which are diagrammatically shown and wherein like parts are correspondingly numbered, the insert 42 has a threaded bore 180 which receives a conduit 181 connected by a vent 182 with the interior of the insert, and at the exterior end is secured a T fitting 183 which has inserted in one branch thereof a ported body member 184 with a longitudinal channel 185 therein terminating in a restricted portion at its end which forms a valve seat 186. The conduit 48 threaded into the inserted Venturi section 39 passes through conduit 181 and is connected to channel 185 in the body 184. A connecting channel 188 in the ported body member communicates with a U-shaped pipe section 189 which in turn communicates with a suitably enlarged chamber 191 in the valve stem channel 192 of the bonnet member 193 threaded into the ported body member. A valve stem 194 extending through the channel 192 carries at its inner end the double seat needle valve 187, in a control chamber 195, tapered valve portions at its end fitting the seats 186 and 196. The valve stem has the valve operating member 197 which is graduated and may be read in connection with a suitable reference point on the bonnet. The conduit 48 communicates by the channel 185, chamber 195 and pipe 198, and through the valve 67 with the conduit 138, while the conduit 181 communicates through pipe 199 and valve 79 with the conduit 135.

The boost limiting device comprises a cross conduit 201 in the T 183 connected with the conduit 181 at one end and at the other end with the inlet side of the back pressure regulator 202. Regulator 202, which is partly diagrammatically shown, contains a diaphragm 203 and provides a chamber 204 above the diaphragm which is open to the atmosphere and a chamber 205 under the diaphragm which communicates with conduit 201. The diaphragm 203 is loaded by an adjustable spring 206 or by any other suitable means and is connected to a valve 207 which controls communication between inlet pipe 201 and outlet conduit 207 connecting with the valve chamber 195. Thus, it will be seen that valve chamber 195 can be connected with the pressure in the main 2 by closing conduit 185 by means of valve 187, or can be connected thereto by opening of valve 207. Ordinarily, valve 187 is positioned clear of seats 186 and 196 in order thereby to govern the rate of boost.

The operation of the boost limiting device is as follows. When the pressure in the main 2 becomes too high, this pressure which is communicated to the regulator chamber 205 through conduits 201 and 181 and vent 182 raises the diaphragm 203 to open the valve 208 which allows a flow from the conduit 201 to the conduit 208 and valve chamber 197, thence by passage 185 and conduit 48 to the throat of the Venturi section. As conduit 198 is connected to chamber 195 the pressure in conduit 198 will become substantially equal to that in passage 199 when valve 207 is open and when valves 67 and 79 are opened a zero differential will be impressed on chambers 110 and 121 to which conduits 198 and 199 are connected. The regulator 27 then becomes responsive solely to the pressure in chamber 30, which is high enough to close valve 32 and keep it closed until the pressure in main 2 falls below the maximum predetermined pressure. The predetermined limit that thus can be placed on the amount of boost desired in the system can be adjusted by means of the adjustable spring 206, and the rate of boost can be governed by positioning valve 187 to seat against seat 196 only or to be spaced from both seats the desired amount. This positioning of the valve 187 can be accurately gauged by the graduated handle 197.

The modification disclosed in Figure 7 is particularly applicable to the system shown in Figure 1, and when used in this connection conduits 138 and 135 will be connected with conduits 227 and 228 respectively. When assembled in this manner it will be seen that the boost limiting device operates to equalize the pressure in chambers 223 and 224, thus eliminating their effect on the diaphragm 211, which then becomes entirely responsive to the weight 218, and if this weight is initially set to close the valve 4 at a predetermined pressure, the valve 4 thus will close and not re-open until the pressure in conduit 2 has fallen down to the predetermined maximum pressure for which diaphragm 203 is loaded. When diaphragm 203 closes valve 207, a differential pressure across diaphragm 222 then again becomes established and diaphragm 211 becomes responsive to the loader 220.

In applying the invention to a pilot loading system, the outlet pressure of main 2 is led to one side of the diaphragm of a main regulator and the regulator 27 shown in Figure 5 has its inlet 26 connected to the high pressure main 2 and its outlet 35 connected to the other side of the diaphragm of the main regulator, the flow therethrough being bled to atmosphere or back into main 2 through a suitable needle valve or restricted orifice. The connections 111 and 124 are connected as shown in Figure 1 and the conduit 159 in Figure 1 is connected to the outlet side 35 of the regulator 27.

Having described our invention, what we claim and desire to secure by Letters Patent is:

1. In a fluid pressure regulating system, the combination of high and low pressure mains, a valve for controlling passage of fluid between said mains, a pressure responsive device having operating means connected to said valve, a conduit for supplying fluid under pressure to said pressure responsive device to control the operation thereof, a valve in said conduit, pressure responsive means to control said latter valve, a low pressure producing device in one of said mains, means to conduct the low pressure produced thereby to said latter pressure responsive means to control said latter valve, and means for intermittently connecting said latter conducting means to the source of low pressure.

2. In a fluid pressure regulating system, the combination of high and low pressure mains, a valve controlling passage of fluid between said mains, a pressure responsive device having operating means connected to said valve, a conduit including an outlet pressure regulator for supplying fluid under pressure from the high pressure main at a predetermined pressure to said pressure responsive device to control the operation thereof and discharging into the low pressure main, a valve in said conduit, means responsive to the pressure in the low pressure main for controlling said valve, a source of low pressure in said low pressure main, and means for intermittently conducting the low pressure from said source upon said latter means for loading the same.

3. In a fluid pressure regulating system, the combination of high and low pressure mains, a valve controlling passage of fluid between said mains, a pressure responsive device having operating means connected to said valve, a conduit for supplying fluid under pressure to said pressure responsive device to control the operation thereof, a valve in said conduit, a flow responsive differential pressure producing device in one of said mains, means responsive to the differential pressure developed thereby to control said valve, and means for intermittently connecting said latter means to the source of differential pressure.

4. In a fluid pressure regulating system, the combination of high and low pressure mains, a valve for controlling passage of fluid between said mains, a pressure responsive device having valve operating means connected to said valve, means normally biasing said pressure responsive device and tending to open said valve, a conduit containing an outlet pressure controlled pilot regulator for supplying fluid at a predetermined pressure to said pressure responsive device and opposing said biasing means, an outlet pressure controlled relief valve in said conduit providing escape of fluid from said conduit, a flow responsive low pressure producing device in said main, means for impressing the low pressure upon said relief valve for operating the same, and means operating at a uniform speed for intermittently applying said low pressure to the relief valve.

5. In a fluid pressure regulating system, the combination of high and low pressure mains, a valve for controlling passage of fluid between said mains, a pressure responsive device connected to operate said valve, a conduit for supplying fluid under pressure to said pressure responsive device to control the operation thereof, valve means in said conduit for relieving the pressure therein, a source of low pressure in said low pressure main, means responsive to the source of low pressure for controlling said latter valve, means for intermittently applying the low pressure from said source to said latter means, and means for controlling the time interval of operation of said intermittent means.

6. In a fluid pressure regulating system, the combination of high and low pressure mains, a valve for controlling passage of fluid between said mains, a pressure responsive device having valve operating means connected to said valve, an outlet pressure pilot regulator having its inlet connected to the high pressure main and a conduit connecting the outlet thereof to said pressure responsive device to control the operation thereof, a fluid motor having its inlet connected to said pilot regulator outlet conduit, an outlet pressure regulator in the inlet conduit of the motor, a restriction in the inlet conduit of the motor on the downstream side of said latter pressure regulator, means connecting said latter pressure regulator with the downstream side at said restriction to produce a uniform flow of fluid to the motor whereby the motor is operated at a uniform speed, a pressure differential producing device, valve means in the pilot regulator outlet conduit for relieving the pressure therein, means responsive to the differential pressure developed by the differential pressure producing device for controlling said latter valve means, and means actuated by said motor for intermittently impressing said differential pressure on the latter means.

7. In a fluid pressure regulation system, the combination of high and low pressure mains, valve means controlling flow of fluid between said mains, a fluid motor supplied by fluid from one of said mains, an outlet pressure regulator in the inlet conduit of the motor, a restriction on the downstream side of said pressure regulator, a conduit on the downstream side of said restriction connected to the other side of said regulator, a conduit, and valve means in said latter conduit operated by said motor.

8. In a fluid pressure regulating system, the combination of high and low pressure mains, valve means controlling flow of fluid between said mains, a fluid motor having its inlet connected to the high pressure main and its outlet connected to the low pressure main, means for maintaining said motor at constant speed of operation, a conduit, and valve means in said conduit operated by said motor.

9. In a fluid pressure regulating system, the combination of high and low pressure mains, a valve for controlling passage of fluid between said mains, a pressure responsive device having valve operating means connected to said valve, an outlet pressure pilot regulator having its inlet connected to the high pressure main and a conduit connecting the outlet thereof to said pressure responsive device to control the operation thereof, a fluid motor having its inlet connected to said regulator pilot outlet conduit, means for operating said motor at constant speed, a pressure differential producing device, valve means in the pilot regulator outlet conduit for relieving the pressure therein, means responsive to the differential pressure developed by the differential pressure producing device for controlling said latter valve, and means actuated by said motor for intermittently impressing said differential pressure on the latter means.

10. In a fluid pressure regulating system, the combination of high and low pressure mains, an outlet pressure regulator having its inlet connected to the high pressure main, a fluid motor, a conduit connected from the regulator outlet to the fluid motor, a conduit connecting the fluid motor outlet to the low pressure main, a second outlet pressure regulator in the inlet conduit of the motor comprising a diaphragm subject to the outlet pressure in said conduit on one side, a valve secured to said diaphragm, a restriction in said conduit and a conduit on the downstream side of said restriction connected to the other side of the diaphragm of said regulator whereby the motor is operated at uniform speed.

11. In an apparatus of the character described, the combination of high and low pressure mains, valve means controlling passage between said mains, a pressure responsive device having means connected to said valve, a conduit for supplying fluid pressure to said pressure responsive device to control the operation thereof, a relief valve in said conduit, a differential pressure producing device in said low pressure main, and means for loading said relief valve by the differential pressure at predetermined intervals, comprising a uniformly operating motor, a conduit between said relief valve and differential pressure producing device, and valve means in said latter conduit intermittently operated by said motor.

12. In a fluid pressure regulating system, the combination of high and low pressure mains, a valve for controlling passage of fluid between said mains, a pressure responsive device having operating means connected to said valve, means for subjecting the pressure responsive device to the pressure in the low pressure main, means for producing a pressure differential dependent on rate of flow, means separate from the pressure responsive device for loading the pressure responsive device in accordance with said pressure differential, and means for interrupting the pressure differential loading of said latter means.

13. In a fluid pressure regulating system, the combination of high and low pressure mains, valve means controlling passage of fluid between said mains, pressure responsive means to govern the operation of said valve, a conduit including an outlet pressure regulator for supplying fluid under pressure from the high pressure main at a predetermined pressure to said pressure responsive means, a second outlet pressure regulator in said conduit having a plurality of diaphragms therein for venting the pressure in said conduit, a source of differential pressure in said low pressure main, and means for intermittently conducting the differential pressure from said source to said diaphragms of said outlet pressure regulator for controlling the pressure in said conduit.

14. In a fluid pressure regulating system, the combination of high and low pressure mains, a valve controlling passage of fluid between said mains, a pressure responsive device having operating means connected to said valve, a conduit for supplying fluid under pressure to said pressure responsive device to control the operation thereof, an outlet pressure controlled relief valve in said conduit comprising a casing having an inlet connected to said conduit and an outlet, a valve for controlling flow between said inlet and outlet, a diaphragm connected to said valve and providing a control chamber in direct communication with said outlet, a dividing wall providing a confined chamber on the opposite side of said diaphragm, a second diaphragm providing a confined chamber on the opposite side of said dividing wall, means connecting said diaphragms for conjoint movement, means for sealing said connecting means with relation to said dividing wall, a source of differential pressure in said low pressure main and means intermittently connecting said differential pressure across said dividing wall.

ALLEN D. MacLEAN.
FRITZ NIESEMANN.

CERTIFICATE OF CORRECTION.

Patent No. 2,308,187. January 12, 1943.

ALLEN D. MacLEAN, ET AL.

It is hereby certified that error appears in the printed specification of the above numbered patent requiring correction as follows: Page 5, second column, line 30, claim 3, before "valve" insert --second--; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.